US011998985B2

(12) United States Patent
Estournes et al.

(10) Patent No.: US 11,998,985 B2
(45) Date of Patent: Jun. 4, 2024

(54) USE OF A DEFORMABLE INTERFACE FOR THE FABRICATION OF COMPLEX PARTS

(71) Applicants: Universite Toulouse III—Paul Sabatier, Toulouse (FR); Centre National De La Recherche Scientifique, Paris (FR)

(72) Inventors: Claude Estournes, Rieumes (FR); Charles Maniere, Caen (FR); Lise Durand, Toulouse (FR)

(73) Assignees: Universite Toulouse III—Paul Sabatier, Toulouse (FR); Centre National De La Recherche Scientifique, Paris (FR)

(*) Notice: Subject to any disclaimer, the term of this patent is extended or adjusted under 35 U.S.C. 154(b) by 0 days.

(21) Appl. No.: 17/743,975

(22) Filed: May 13, 2022

(65) Prior Publication Data

US 2022/0266336 A1    Aug. 25, 2022

Related U.S. Application Data

(62) Division of application No. 15/773,791, filed as application No. PCT/EP2016/076657 on Nov. 4, 2016, now abandoned.

(30) Foreign Application Priority Data

Nov. 4, 2015    (FR) ...................................... 1560564

(51) Int. Cl.
*B22F 3/14*        (2006.01)
*B22F 3/105*       (2006.01)
(Continued)

(52) U.S. Cl.
CPC ................ *B22F 3/14* (2013.01); *B22F 3/105* (2013.01); *B22F 5/003* (2013.01);
(Continued)

(58) Field of Classification Search
CPC ........................................................ B22F 3/14
See application file for complete search history.

(56) References Cited

U.S. PATENT DOCUMENTS 3,279,917 A    10/1966   Ballard et al.
3,992,200 A *  11/1976   Chandhok ............... B22F 3/125
                                                    419/45

(Continued)

FOREIGN PATENT DOCUMENTS

JP    H05-031830 A    2/1993
JP    H09-049005 A    2/1997
(Continued)

OTHER PUBLICATIONS

International Search Report dated Jan. 31, 2017 for corresponding International Application No. PCT/EP2016/076657, filed Nov. 4, 2016.

(Continued)

*Primary Examiner* — Jophy S. Koshy
*Assistant Examiner* — Joshua S Carpenter
(74) *Attorney, Agent, or Firm* — David D. Brush; Westman, Champlin & Koehler, P.A.

(57) ABSTRACT

An assembly for densification under load along at least one direction of compression. The assembly includes: at least one volume to be densified having a powdery and/or porous composition and having variations in thickness along the direction of compression; and at least one counter-form of a powdery and/or porous composition, having at least one face facing at least one portion of the volume. The face and each of the portions are separated by at least one deformable interface layer.

10 Claims, 4 Drawing Sheets

(51) Int. Cl.

| | |
|---|---|
| B22F 5/00 | (2006.01) |
| B29C 33/00 | (2006.01) |
| B29C 43/00 | (2006.01) |
| C04B 35/10 | (2006.01) |
| C04B 35/111 | (2006.01) |
| C04B 35/48 | (2006.01) |
| C04B 35/486 | (2006.01) |
| C04B 35/634 | (2006.01) |
| C04B 35/645 | (2006.01) |
| B22F 3/15 | (2006.01) |
| B22F 3/17 | (2006.01) |

(52) U.S. Cl.
CPC ...... *B29C 33/0011* (2013.01); *B29C 33/0016* (2013.01); *B29C 43/006* (2013.01); *C04B 35/10* (2013.01); *C04B 35/111* (2013.01); *C04B 35/48* (2013.01); *C04B 35/486* (2013.01); *C04B 35/63424* (2013.01); *C04B 35/645* (2013.01); *B22F 3/15* (2013.01); *B22F 3/17* (2013.01); *B22F 2301/052* (2013.01); *C04B 2235/666* (2013.01); *C04B 2235/77* (2013.01); *C04B 2235/94* (2013.01); *C04B 2235/945* (2013.01)

(56) References Cited

U.S. PATENT DOCUMENTS

| | | | | |
|---|---|---|---|---|
| 4,414,028 | A * | 11/1983 | Inoue | B22F 3/02 419/60 |
| 4,673,549 | A * | 6/1987 | Ecer | B22F 3/156 419/48 |
| 9,364,887 | B2 | 6/2016 | Godon et al. | |
| 2011/0068500 | A1 | 3/2011 | Martin et al. | |
| 2013/0333214 | A1 | 12/2013 | Godon et al. | |

FOREIGN PATENT DOCUMENTS

| | | |
|---|---|---|
| JP | 2004307961 A | 11/2004 |
| JP | 2011058095 A | 3/2011 |
| JP | 2014508888 A | 4/2014 |
| KR | 20140035599 A | 3/2014 |
| WO | 2015007966 A1 | 1/2015 |

OTHER PUBLICATIONS

English translation of the International Written Opinion dated Jan. 31, 2017 for corresponding International Application No. PCT/EP2016/076657, filed Nov. 4, 2016.

Thomas Voisin et al., Temperature control during Spark Plasma Sintering and application to up-scaling and complex shaping, Journal of Materials Processing Technology, vol. 213, No. 2, Feb. 1, 2013 (Feb. 1, 2013), pp. 269-278, XP055340828.

Attia U M et al., "Creating movable interfaces by micro-powder injection moulding" Journal of Materials Processing Technology, vol. 214, No. 2, Sep. 19, 2013 (Sep. 19, 2013), pp. 295-303, XP028796888.

Pavia A et al., "Electro-thermal measurements and finite element method simulations of a spark plasma sintering device", Journal of Materials Processing Technology, Elsevier, NL, vol. 213, No. 8, Feb. 10, 2013 (Feb. 10, 2013), pp. 1327-1336, XP028547404.

G. Molénat, L. Durand, J. Galy, A. Couret, "Temperature Control in Spark Plasma Sintering: An FEM Approach" in Journal of Metallurgy. 2010 (2010).

P. Mondalek, L. Silva, M. Bellet, "A Numerical Model for Powder Densification by SPS Technique" in Advanced Engineering Materials. 13 (2011).

Japanese Notice of Reasons for Refusal including English translation dated Sep. 30, 2020 for corresponding Japanese Application No. 2018-541552.

Japanese Notice of Reasons for Refusal including English translation dated Aug. 4, 2021 for related Japanese Application No. 2018-541552.

Restriction Requirement dated Sep. 16, 2020, for corresponding U.S. Appl. No. 15/773,791, filed May 4, 2018.

Office Action dated Mar. 3, 2021, for corresponding U.S. Appl. No. 15/773,791, filed May 4, 2018.

"Tropical Sand Art Bottles", Web Page <https://www.orientaltrading.com/tropical-sand-art-bottles-a2-48_5821.fltr>, Nov. 13, 2014, retrieved from Internet Archive Wayback Machine <https://web.archive.org/web/20141113000434/https://www.orientaltrading.com/tropical-sand-art-bottles-a2-48_582 (Year: 2014).

Final Office Action dated Nov. 16, 2021, for corresponding U.S. Appl. No. 15/773,791, filed May 4, 2018.

Advisory Action dated Feb. 15, 2022, for corresponding U.S. Appl. No. 15/773,791, filed May 4, 2018.

* cited by examiner

USE OF A DEFORMABLE INTERFACE FOR THE FABRICATION OF COMPLEX PARTS

CROSS-REFERENCE TO RELATED APPLICATIONS

This Application is divisional of U.S. application Ser. No. 15/773,791, filed May 4, 2018, which is a Section 371 National Stage Application of International Application No. PCT/EP2016/076657, filed Nov. 4, 2016, and published as WO 2017/077028 A1 on May 11, 2017, not in English, the contents of which are incorporated by reference in their entireties.

FIELD OF THE INVENTION

The field of the invention is that of the fabrication of mechanical parts of complex shapes by the densification of powdery or porous materials.

More particularly, the invention relates to the improvement of an assembly of powdery or porous materials adapted to being densified under load both in its use and the technical characteristics of the complex mechanical parts obtained.

PRIOR ART

Many methods of densification of powders or porous materials are known at present and are used daily in industry. These methods include especially forging, hot pressing, hot isostatic pressing and spark plasma sintering (SPS) in the following description, and are aimed at consolidating a defined volume of metallic powders, ceramics or polymers by the heating of this volume and the application of unixial pressure or multiaxial pressure.

Figure 1:
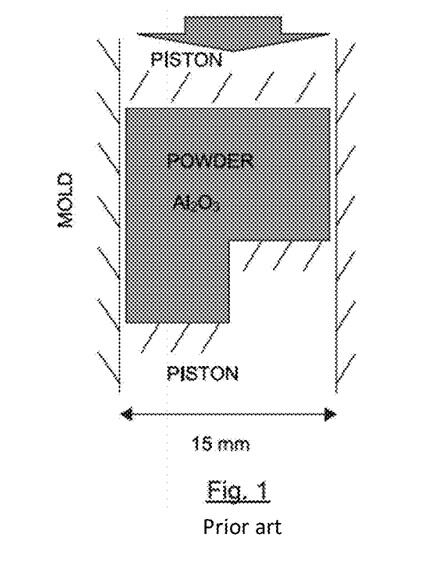
FIG. 1 is a schematic view of an initial assembly for SPS of the prior art implementing a cylindrical part having a step.
Figure 2:
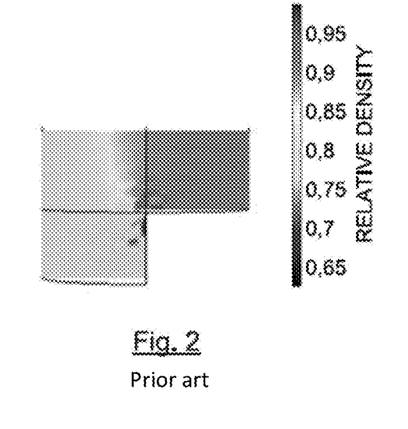
FIG. 2 is a simulation illustrating the relative density field at the end of sintering of a cylindrical part possessing a step.
Figure 3:
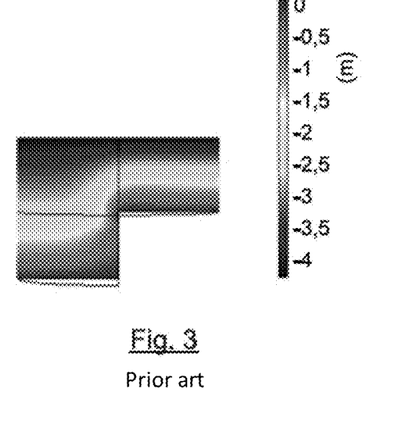
FIG. 3 is a simulation illustrating the vertical displacement field at the end of sintering of a cylindrical part possessing a step.

SPS especially is a known way of subjecting a cylindrical volume of compressed powder to a pulsed current enabling a significant increase in the kinetics of densification of these powders and thus making it possible to obtain mechanical parts of which the fine microstructures are preserved. The modes of densification used by SPS however have the drawback of causing inhomogeneities of densification when complex-shaped parts shapes have major differences in thickness. Thus, according to P. Mondalek, L. Silva, M. Bellet, "A Numerical Model for Powder Densification by SPS Technique" in *Advanced Engineering Materials*. 13 (2011), a cylindrical T-shape possesses, at the end of sintering, a porous zone with a relative density of the order of 70%. In order to understand this phenomenon more clearly, a simulation involving a cylindrical part possessing a step is used. The initial assembling geometry of the SPS technique as well as the densification field and the end-of-cycle vertical displacement field are illustrated by FIGS. 1 to 3. The simulation consists of a purely mechanical model, with a temperature cycle, imposed on the entire geometry. The boundary conditions are constituted by a fixed displacement, along the z axis of the cylinder of the lower piston. A compression force is applied to the top face of a cylindrical volume of alumina powder. The lateral conditions are no-penetration conditions. The thermal cycle is defined according to a temperature ramp of 100K/minute up to 1400° C. followed by a five-minute dwell time. The force applied is 18000 N. It is observed that, at the final state, the low thickness zone is dense, and the high thickness zone is porous with a relative density of the order of 80% (FIG. 2). The vertical displacement field (FIG. 3) is expressed by highly curved iso-displacement lines that contrast with the lines of a frictionless cylindrical sample, where the iso-displacement lines are horizontal. This result can be explained by the non-uniformity of the shrinkage observed between the two zones of different thicknesses. Thus, the low thickness zone gets densified more rapidly because, for equal displacements, its distance of maximum shrinkage is attained more rapidly than within the high thickness zone. Thus, once the low thickness zone is totally densified, the sintering is interrupted and the high thickness zone necessitating more shrinkage cannot terminate its densification process. The heterogeneity of the densification field revealed by the simulation results from this phenomenon. In the context of such an assembling, the making of parts of complex shapes by the classic SPS method is therefore made difficult given the complex geometry of the parts to be fabricated which is expressed by differences of thickness and involves variations of shrinkages.

It must be noted that these problems of heterogeneity of densification relate solely to the sintering of parts of complex shape. Indeed, in the context of volumes to be densified of simple shapes, i.e. having constant thickness, the distance of shrinkage is sometimes the same and thus makes it possible to obtain a homogenous densification of the part. There is therefore no encouragement towards drawing inspiration from documents on the sintering of parts of non-complex shapes in order to resolve the observed problems of heterogeneity of densification.

There is a need to overcome the heterogeneity of densification of complex parts fabricated by known methods of densification under loads.

SUMMARY

The proposed technique does not have these drawbacks of the prior art. More particularly, in at least one embodiment, the proposed technique refers an assembly for densification under load along at least one direction of compression, comprising:
  at least one volume to be densified having a powdery and/or porous composition, this volume to be densified having variations in thickness (e) along the direction of compression,
  at least one counter-form of powdery and/or porous composition, having at least one face facing at least one portion of said volume, said assembly being characterized in that said portion and said face are separated by at least one deformable interface layer.

The term "method of densification under load" is understood to mean any process of sintering under load or creep effect seeking to consolidate a defined volume of metal powder, ceramics, polymers, by heating of this powder and the application of a unixial, multiaxial or isostatic pressure. These methods include especially forging, hot pressing, hot isostatic pressing, SPS or any other known method following this same general principle of operation. The invention therefore relates to assembling adapted to the implementation of such methods of densification under load, and having specific technical characteristics (melting point, thermal capacity, activation energy etc.) enabling it to withstand major thermal stresses (for example sudden temperature increases of the order of thousands of degrees) and mechanical stresses (compression of the order of about tens of thousands of Newtons).

The term "volume to be densified" designates a volume of powders and/or porous materials that are to form a mechanical part following the use of the densification method. This gives an equivalent designation, "part to be formed", used in the present description. Such a volume has a complex shape, and this is structurally expressed by variations in thickness of continuous segments of the volume to be densified, in the context of a projection along the direction of compression. It is necessary to distinguish the thickness of a shape and its height, this height possibly designating discontinuous segments of a volume along this same projection. For example, a volume with the shape of a dual cone generated by revolution, when considered along its axis of revolution, has a constant height but a variable thickness.

A surface portion of the volume to be densified, i.e. all or part of its external surface, has a complementarity of shape with at least one face of a counter-form. Here below in the description, the terms "surface portion" and "portion" are considered to be equivalent. According to one particular embodiment, the assembly can also include a plurality of counter-forms. An interface layer, for its part, acts as a separation between this portion of the part to be formed and the counter-form. The deformable character of the interface layer is expressed by a thickness, a chemical reactivity and a capacity of compaction that are negligible as compared with those of materials forming part of the respective compositions of the volume to be densified and of the counter-form. During the densification of the assembly, this interface layer will thus get deformed and follow the shrinkage of the volume to be densified until the forming of a counter-form of the concerned portion of the part to be fabricated, once the process of densification is completed. The shifting of the interface layer enables the homogenous distribution, on the complex part to be formed, of all the stresses transmitted by the counter-form and the tooling using for the densification under load (piston-die). The complex part obtained therefore has a scaling of shrinkage on its entire surface (portion) in contact with the interface layer. In a complementary way, the flaws and fractures that can be generated within the counter-form during the densification process and/or a subsequent step of fracturing are entirely or partly blocked by the deformable interface layer and therefore do not spread in the part to be formed, of which the surface appearance and more generally the microstructure are preserved. Finally, such an assembly enables the simultaneous fabrication of one or more parts of complex shapes in the context of a method of densification under load, the compressive directions of which are limited (for example uniaxial compression).

The present invention thus relies on a novel and inventive concept of providing an assembly for densification under load of complex shapes, implementing a deformable interface layer, enabling the simultaneous fabrication of one or more complex-shaped parts, said parts having a scaling of densification as well as a preserved microstructure. Such an assembly provides especially the advantage of being capable of implementation in the context of a method of densification under load having low complexity.

According to one particular characteristic of the invention, the variations of thicknesses are continuous.

The application of the invention therefore enables a scaling of densification as well as a microstructure that is kept for complex volumes having constant variations of thickness, for example spherical or pyramid-shaped volumes.

According to one particular characteristic, said counter-form and said volume to be densified are of distinct shapes.

This characteristic is the consequence of the implementing of the invention for particularly complex shapes.

According to one particular characteristic, the counter-form includes the volume in its totality.

Such a configuration thus enables the fabrication of parts, the entire rim of which has a scaling of densification.

According to another particular characteristic of the invention, the counter-form includes only one part of the volume to be densified.

Advantageously, the speed of densification of the material constituting said volume is greater than or equal to the speed of densification of the material constituting said counter-form.

Such a variation and speed of densification can be due to the differences in chemical composition existing between two materials, for example between alumina and zirconia, or differences in microstructure, for example between two materials of a same chemical composition but of different grain sizes.

As illustrated here below in the description, exclusively in the context of complex-shaped volumes, when the material of the counter-form gets densified more speedily than that of the part to be formed, this counter-form stops the densification of the part before it is completely dense. This is expressed by a heterogeneity of density within the part formed. On the contrary, when the material constituting the part to be formed gets densified faster than the counter-form, the method of densification makes it possible to achieve total densification of the part to be formed.

This particular choice of materials constituting the volume to be formed and the counter-form and more generally the taking into account of the rules of densification of these materials therefore improves the homogeneity of densification of the part formed.

According to one particular characteristic, the volume to be densified and the counter-form have a chemical composition and a microstructure that are identical.

The implementing of materials of a same chemical composition and the same microstructure for the part to be formed and the counter-form or forms has the advantage of facilitating the forecasting of shrinkages of material generated during the step of densification.

Alternatively, the volumes to be densified and the counter-form have a conical composition and/or microstructure that are different.

The use of materials of different chemical compositions and/or different microstructures, for its part; extends the possibilities available to the designer in the choice of materials forming the composition and the microstructure of the part to be formed, or in the composition of the counter-form. It is thus possible, for of the part to be formed, to use a material having advanced technical properties while at the same time selecting a low-cost material for the constitution of the counter-form.

It must be ensured however that there is no chemical interaction between these materials and the interface material as this interaction that could potentially impair the capacity of the final parts to be separated.

According to one particular characteristic, said portion and said face are separated by a plurality of consecutive deformable interface layers.

The term "consecutive" qualifies interface layers that are in direct contact with one another.

According to one particular characteristic, the assembly comprises a plurality of complex-shaped volumes to be densified, and at least one counter-form, all having a powdery and/or porous composition, said counter-form has at least one face facing at least one portion of each of said volumes, and said faces and each of said portions are separated by at least one deformable interface layer.

The simultaneous fabrication of a plurality of parts thus makes it possible to increase the hourly production rate of the fabrication method implementing such an assembly.

The invention also relates to a method for the fabrication of at least one part of complex shape characterized in that it comprises:

- a step of incorporation, within an assembly for densification under load along at least one direction of compression, of a deformable interface layer having an initial geometrical shape and separating at least one portion of a volume to be densified of a powdery and/or porous composition and having variations of thickness along said direction of compression from at least one face of a counter-form of a powdery and/or porous composition,
- a step of densification under load of said assembly during which said interface layer (9) is deformed to adopt a final geometrical shape distinct from said initial geometrical shape.

During this method of fabrication, the volume to be densified undergoes deformation between an initial geometrical shape and a distinct final geometrical shape. This deformation results from stresses exerted by the counter-form on the complex-shaped rim of the volume to be densified. It must be noted that such a geometrical deformation does not come into play in the context of densification of a simple shape, this shape preserving the same geometrical shape throughout the densification (despite of course a reduction of its thickness).

In the context of the densification of a volume of complex shape, it is advantageous to plan for future deformations of the volume to be densified, the counter-form and the deformable interface layer.

According to one particular characteristic, the final height at any desired point ($h_f$) of the part to be formed responds to the following relationship:

$$h_i = h_f \cdot d_f / d_i$$

where $h_i$ represents the height of stretching at any point and $d_i$ and $d_f$ represent the initial and final relative densities of the part to be formed.

This equation known as the "preform" equation makes it possible to more efficiently define the deformations of the volume to be densified and of the deformable interface layer.

The setting up of such a step for incorporating the deformable interface layer is particularly complex, given the need to adapt this layer to the different materials constituting the part to be formed, the counter-form, and this interface layer.

Thus, according to one particular embodiment, the said step of incorporation is implemented by powdery deposition of said interface layers on the zones of said counter-form(s) placed so as to be facing the part to be formed but also between the counter-forms if necessary.

According to one alternative embodiment, said step of incorporation is implemented by the insertion, within said assembly, of one or more solid interface layers preferably a flexible graphite foil (for example Papyex®) prior to a step for filling said assembly with materials respectively constituting the part to be formed and said counter-form or counter-forms.

According to one particular embodiment, the method of fabrication comprises a step for the extraction of said part from said assembly by the sacrificial destruction of said counter-form or counter-forms and/or said deformable interface layers.

In the context of a known assembly of the prior art, the risks that the part to be formed might become brittle or fragile because of the spreading of cracks from the counter-form or counter-forms to the part to be formed, following the fracturing step, are known to those skilled in the art. In the context of the invention, the knowledge of these risks would have thus diverted those skilled in the art from this technical approach and would have encouraged those skilled in the art to envisage an alternative means of extraction of the formed part from the assembly.

Although it has not been explicitly described, the different embodiments described above can be implemented according to any combination or sub-combination.

FIGURES

Other features and advantages of the invention shall appear more clearly from the following description of particular embodiments, given by way of simple illustratory and non-exhaustive examples and from the appended figures, namely.

The different elements illustrated by the figures are not necessarily represented to real scale, with greater emphasis placed on the representation of the general operation of the invention.

DETAILED DESCRIPTION OF PARTICULAR EMBODIMENTS OF THE INVENTION

Several particular embodiments of the invention are presented here below and relate to the fabrication 1 via an SPS method 2 of the complex-shaped mechanical parts 3 with the shape of a semi-sphere, a cone, a square-based pyramid and a star-based pyramid. It is understood that the present invention is in no way limited by these particular embodiments and that other embodiments can perfectly well be implemented.

Thus, and according to alternative embodiments, the invention relates to the fabrication 1 of complex parts 3 that can have a great diversity of shape with the possible adapting of the method of fabrication 1 to the degree of complexity of these shapes. The complexity of shape results from variations in the thicknesses of this shape along the direction of compression. This complexity increases for parts having:
- a plane base with differences of heights and clearances (ease of demolding)
- a non-plane base with differences of heights and clearances (ease of demolding)
- a plane base with differences of heights but without clearances (need to segment the sacrificial part)
- a non-plane base without clearances (need to segment the sacrificial part)
- a hollow-shape (two or more parts requiring an additional assembling step).

Similarly, the step of densification 2 is not limited to SPS but also relates to forging, hot pressing, isostatic hot pressing or any other known method of consolidation and creep effect for powdery and/or porous materials.

SPS Sintering of a Semi-Sphere

Figure 4:
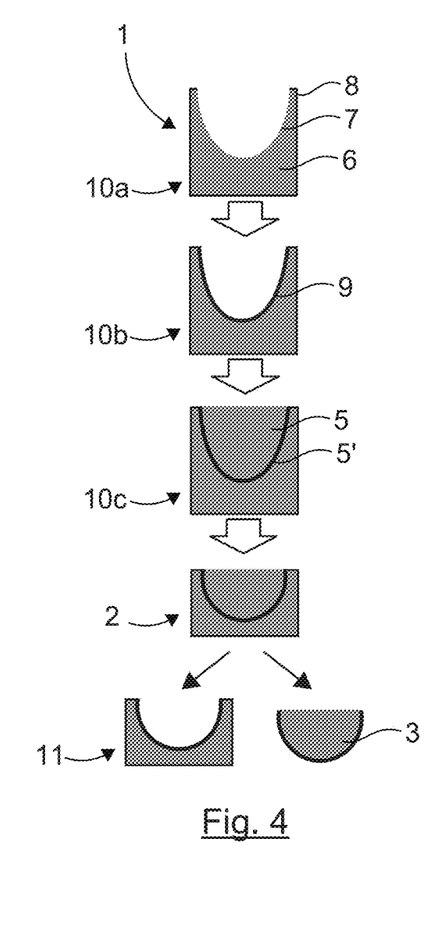
FIG. 4 is a schematic view of the successive steps of the forming of an assembly according to one particular embodiment of the invention.

FIG. 4 illustrates the subsequent steps of a method of fabrication 1 aimed densifying an assembly by implementing an SPS method 2 in order to obtain a semi-sphere 3 made of poly methyl methacrylate (PMMA).

It must be specified that it is very difficult to obtain a dense semi-sphere by SPS technology within the limits of the method of fabrication known in the prior art, especially given the rapid densification of the rim of the volume 5 of powder that is to form the semi-sphere 3: this rapid densification prematurely blocks the densification process 2.

The approach adopted by the inventors consists in placing, in a cylindrical mold 8, a half-ellipsoid 5 of PMMA powder and a porous sacrificial counter-form 6 integrating a face 7 facing the half-ellipsoid, with a deformable interface layer 9 enabling the demolding of the obtained part 3 and of the sacrificial counter-form 6 after sintering.

According to alternative embodiments of the invention, the PMMA powder that goes into the composition of the part to be formed 5 can be replaced by alumina powder, zirconia powder or any other known powdery and/or porous composition. Similarly, the counter-form 6 can be constituted by any type of known powdery and/or porous material, having preferably a densification curve close to that of the material constituting the part to be formed 5 and preferably the pair formed is formed by two materials of a same class (for example: metal/metal or ceramic/ceramic or polymer/polymer).

According to the present embodiment, the half-ellipsoid shape has been chosen because it is the stretched form of the desired semi-sphere. In the case of uniaxial compression, a form and a counter-form with proximate densification properties, the stretching height at any point ($h_i$) is related to the relative initial and final densities of the part ($d_i$, $d_f$) and the final height at any desired point ($h_f$) by the following formula:

$$hi = hf \cdot df / di$$

In a complementary way, the Multiphysics COMPSOL® simulation is used to simulate the distances of shrinkage and deformation induced on a given volume following the implementation of a method of densification. The following publications: G. Molénat, L. Durand, J. Galy, A. Couret, "Temperature Control in Spark Plasma Sintering: An FEM Approach" in *Journal of Metallurgy*. 2010 (2010); A. Pavia, L. Durand, F. Ajustron, V. Bley, A. Peigney, C. Estournés, "Electro-thermal measurements and finite element method simulations of a spark plasma sintering device", in *Journal of Materials Processing Technology*, 213(8), (2013), 1327-1336, and T. Voisin, L. Durand, N. Karnatak, S. Le Gallet, M. Thomas, Y. Le Berre, et al., "Temperature control during Spark Plasma Sintering and application to up-scaling and complex shaping" in *Journal of Materials Processing Technology*. 213 (2013) also deal with this set of problems and issues. In the light of this simulation software and the three articles above, those skilled in the art have the elements needed to determine the forming of the initial volume of the powder 5 depending on the desired shape of the part to be fabricated and the ratio of the densities.

During a first phase of the method of fabrication 1, the PMMA powder is introduced into a graphite mold 8. Preferably, one or more binders such as water, Rhodoviol™ can be incorporated into the powdery mixture in order to improve its technical characteristics. Thereafter, an imprint is formed (step 10a) on the powder bed by means of a half-ellipsoid counter-form obtained by 3D printing. According to one alternative embodiment, the counter-form can also be formed via a method of machining.

A layer 9 of boron nitrite powder (a powder that is inert under sintering) is then deposited (step 10b) in the form of spray on the surface of the imprint. As an alternative, this boron nitrite powder can be replaced by graphite powder or any other material that is inert in consolidation and chemically non-reactive with the material constituting the part to be formed 5.

The internal cavity is then filled with PMMA powder (step 10c) thus forming the volume 5 intended to shape the desired part 3. Finally, the unit enclosed by two graphite pistons is placed in an SPS device for the sintering step 2. During this step, the interface layer 9 of boron nitride will get thus deformed and follow the half-ellipsoid that will get crushed as and when the sintering takes place until the formation of a semi-sphere 3 once the material is densified. The deformation of the interface layer 9 along the lower portion 5' of the half-ellipsoid 5 enables the homogenous distribution therein of all the stresses transmitted by counter-form 6. The semi-sphere 3 obtained therefore has a scaling of shrinkage on the entire surface 5' in contact with the deformed interface layer 9.

The final step is the extraction 11 of the semi-spherical part 3 from the sacrificial counter-form 6 achieved by fracturing of the sacrificial counter-form 6 and the interface layer 9. It has been observed that, following this step of extraction 11, the cracks stop appreciably at the level of the interface layer 9 of boron nitride, thus preserving the semi-spherical part 3 which remains intact.

Figure 5:
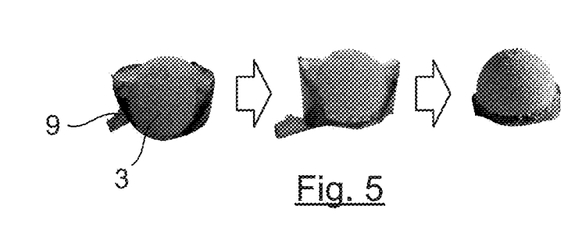
FIG. 5 is a series of photographs illustrating the step of extraction of a mechanical part following the densification, under load, of an assembly according to one particular embodiment of the invention.
Figure 6:
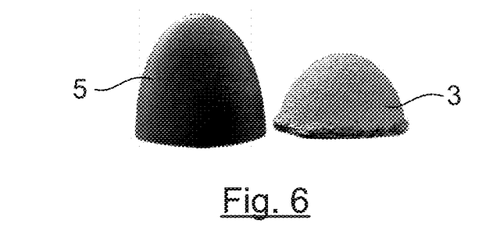
FIG. 6 is a series of photographs illustrating the imprint used for the generation of the initial shape of the part to be formed and the formed part after densification of an assembly according to one particular embodiment of the invention.

FIG. 5 presents a series of photographs illustrating the step of extraction of the part 3 from the assembly and especially the interface layer 9. FIG. 6 for its part illustrates the change in shape induced in the interface layer 9 following the use of the SPS step 2.

SPS Sintering of a Cone, a Square-Based Pyramid and Star-Based Pyramid

Figure 7:
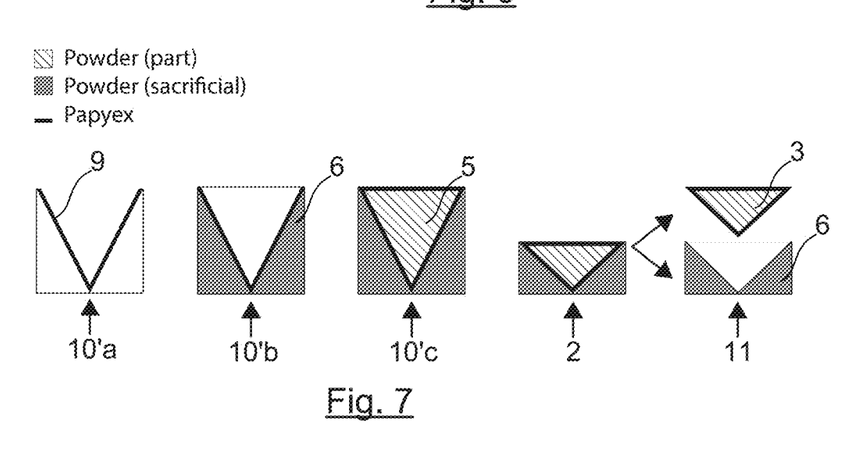
FIG. 7 is a schematic view of the successive steps for forming an assembly according to one alternative embodiment of the invention.
Figure 8:
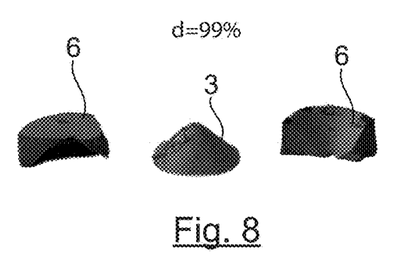
FIG. 8 is a photograph illustrating a conical part as well as fragments of the counter-form obtained following the densification under load of an assembly according to one particular embodiment of the invention.
Figure 9:
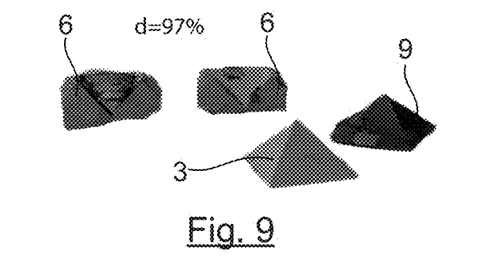
FIG. 9 is a photograph illustrating a part with a square-based pyramid shape as well as fragments of the counter-form obtained following the densification under load of an assembly according to one particular embodiment of the invention.
Figure 10:
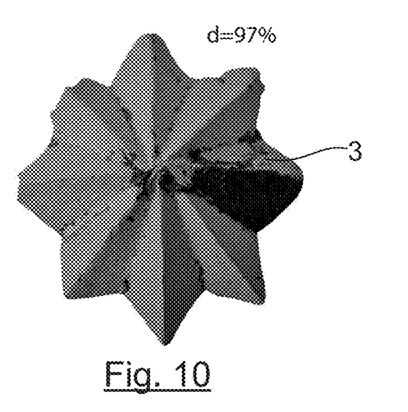
FIG. 10 is a photograph illustrating a part with a star-based pyramid shape obtained following densification under load of an assembly according to one particular embodiment of the invention.
Figure 11:
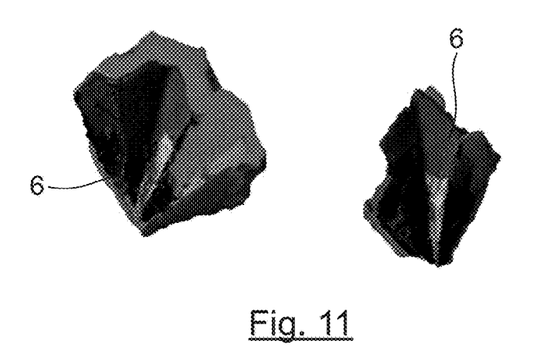
FIG. 11 is a photograph illustrating two fragments of the counter-form obtained following the densification under load of an assembly according to one particular embodiment of the invention.

Depending on the alternative embodiments of the invention, a cone, a square-based pyramid and a star-based pyramid are sintered from an aluminum powder using a graphite foil ((papyex®) as an interface layer 9. As illustrated by FIG. 7, in the context of the use of papyex, the step 10 for placing the assembly consists in giving the desired shape of the interface layer 9 to the papyex by folding and then positioning (step 10'a) the papyex 9 within the assembly, before filling the zones corresponding to the parts to be formed 5 (step 10'c) and to the counter-form 6 (step 10'b) with a powdery and/or porous material.

Figure 12:
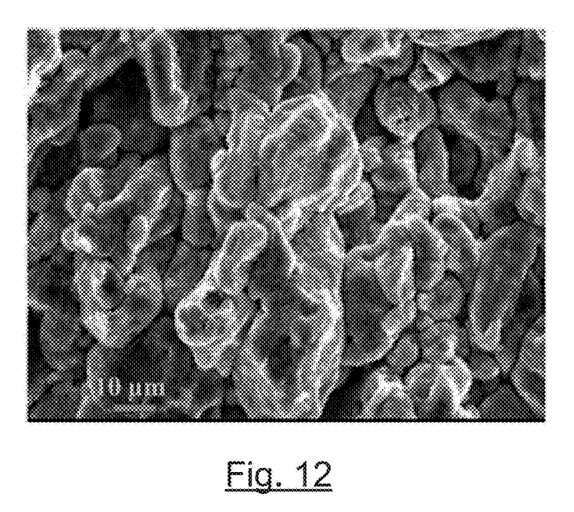
FIG. 12 is an image made by a scanning electron microscope (SEM) of the microstructure of a fracture present on a sacrificial part of a pyramid following the densification under load of an assembly according to one particular embodiment of the invention.

FIGS. 8 to 11 are photographs illustrating the cone-shaped and pyramid-shaped parts 3 as well as the counter-form fragments obtained following the densification under load of an assembly according to these particular embodiments of the invention. As indicated in these photographs, the respective densities of the parts obtained range from 97% to 99%. It is observed that the two pyramid shapes both have well-defined straight ridges. This result is clearly difficult to achieve by known methods of casting in molds without machining. FIG. 12 is an image made through a scanning electron microscope (SEM) of the microstructure of a fracture presented on a sacrificial part of the pyramid. This image especially reflects the low porosity and the satisfactory ductility of the interface layer 9.

Use of Different Materials in the Respective Compositions of the Part to be Formed 5 and the Counter-Form 6

According to one particular embodiment of the invention, the respective chemical compositions of the volume 5 intended to form the part and the counter-form 6 are different. Indeed, although the use of materials of a same nature has the advantage of facilitating the planning of shrinkages of material generated during the densification step, the use of materials of different natures for its part broadens the possibilities offered to the designer in the choice of materials entering into the composition of the part to be formed 5 or the composition of the counter-form 6. It is thus possible, for the constitution of the part to be formed 5, to use a material having advanced technical properties while at the same time selecting a low-cost material for the constitution of the sacrificial counter-form 6.

Thus, according to one particular embodiment, a conical volume 5 is composed of zirconia powder ($ZrO_2$) when the counter-form 6 is composed of alumina powder. The coupling of these two powders is based on their behavior under sintering (temperature and densification curve) which are relatively similar. The zirconia powder forming the conical volume 5 thus gets densified slightly more rapidly than the alumina powder forming the counter-form 6 and thus makes it possible to obtain a totally densified part.

Figure 13:
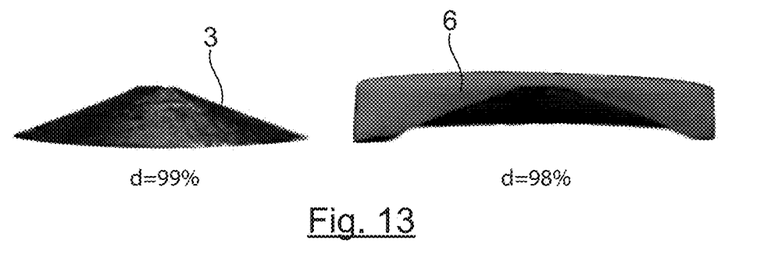
FIG. 13 is a photograph illustrating a cone of zirconia with a density at 99% and a part of the counter-form (alumina density at 98%) obtained following densification under load of an assembly according to one particular embodiment of the invention.
Figure 14:
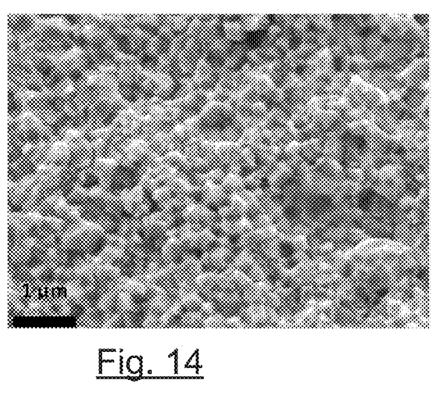
FIG. 14 is an SEM image of the microstructure of a fracture deliberately provoked at the center of a cone made of zirconia following the densification under load of an assembly according to one particular embodiment of the invention.
Figure 15:
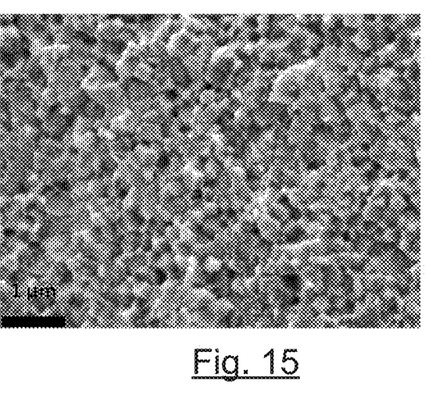
FIG. 15 is an SEM image of the microstructure of a fracture deliberately provoked at the edge of the fine zones of a cone made of zirconia following the densification under load of an assembly according to one particular embodiment of the invention.

FIG. 13 is a photograph illustrating a cone of zirconia with density at 99% and a fragment of alumina with density at 98% obtained following the implementing of SPS sintering. FIGS. 14 and 15 are the SEM images of the fracture obtained at the center and edges of the zirconia cone 3. These SEM images are used especially to observe the fact that the microstructure at the center and at the edge of the cone 3 is homogenous and shows an average grain size of 200 nanometers.

What is claimed is:

1. A method for fabricating at least one part of a shape, wherein the method comprises:
   introducing powder into a mold,
   forming an imprint on said powder with a counter-form to form a sacrificial counter-form having an internal cavity constituted by said imprint,
   after forming the imprint, depositing at least one layer of a material on a surface of said imprint to form at least one deformable interface layer having an initial geometrical shape,
   after depositing the at least one layer of material, introducing powder on a surface of said at least one deformable interface layer into said internal cavity to form a volume to shape the at least one part of the shape,
   densifying under load along at least one direction of compression an assembly comprising said sacrificial counter-form, said at least one deformable interface layer and said volume, wherein said volume has variations of thickness along said direction of compression, wherein said at least one deformable interface layer separates said volume from at least one face of said sacrificial counter-form, and wherein said at least one deformable interface layer is deformed to adopt a final geometrical shape distinct from said initial geometrical shape, and
   extracting said at least one part of the shape from said sacrificial counter-form,
   wherein the material of said at least one deformable interface layer is inert in consolidation and does not chemically react with the powder of said sacrificial counter-form and with the powder of said volume.

2. The method according to claim 1, further comprising extracting said at least one part of the shape from said assembly by sacrificial destruction of said sacrificial counter-form and/or said deformable interface layer.

3. The method according to claim 1, wherein said variations of thicknesses are continuous.

4. The method according to claim 1, wherein said sacrificial counter-form and said volume are of distinct shapes.

5. The method according to claim 1, wherein said sacrificial counter-form includes said volume in its totality, wherein all of an external surface of said volume has a complementarity of shape with said sacrificial counter-form.

6. The method according to claim 1, wherein a speed of densification of the powder of said volume is greater than or equal to a speed of densification of the powder of said sacrificial counter-form.

7. The method according to claim 1, wherein said volume and said sacrificial counter-form have a chemical composition and/or a microstructure that are identical.

8. The method according to claim 1, wherein said volume and said sacrificial counter-form have a chemical composition and/or a microstructure that are different.

9. The method according to claim 1, wherein said volume and said sacrificial counter-form are separated by a plurality of consecutive deformable interface layers.

10. The method according to claim 1, wherein said assembly has a plurality of volumes having variations in thickness along said direction of compression, wherein said sacrificial counter-form has at least one face facing each of said volumes, and wherein said at least one deformable interface layer is formed for separating said at least one face of said sacrificial counter-form and each of said volumes.

\* \* \* \* \*